United States Patent
Grudin

(10) Patent No.: US 9,057,739 B2
(45) Date of Patent: Jun. 16, 2015

(54) SENSOR RESPONSE CALIBRATION FOR LINEARIZATION

(75) Inventor: Oleg Grudin, Montreal (CA)

(73) Assignee: SENSORTECHNICS GMBH, Puchheim (DE)

( * ) Notice: Subject to any disclaimer, the term of this patent is extended or adjusted under 35 U.S.C. 154(b) by 606 days.

(21) Appl. No.: 13/393,579

(22) PCT Filed: Sep. 3, 2010

(86) PCT No.: PCT/CA2010/001395
§ 371 (c)(1),
(2), (4) Date: Mar. 1, 2012

(87) PCT Pub. No.: WO2011/029182
PCT Pub. Date: Mar. 17, 2011

(65) Prior Publication Data
US 2012/0166124 A1    Jun. 28, 2012

Related U.S. Application Data

(60) Provisional application No. 61/240,380, filed on Sep. 8, 2009.

(51) Int. Cl.
*G01P 21/02* (2006.01)
*G01D 18/00* (2006.01)
*G01F 1/696* (2006.01)
*G01P 5/12* (2006.01)

(52) U.S. Cl.
CPC .............. *G01P 21/025* (2013.01); *G01D 18/00* (2013.01); *G01F 1/6965* (2013.01); *G01P 5/12* (2013.01)

(58) Field of Classification Search
CPC .................................................. G01D 18/008
USPC .............. 702/85, 86, 130, 101; 73/1.01, 1.02, 73/23.2
See application file for complete search history.

(56) References Cited

U.S. PATENT DOCUMENTS

| | | | | |
|---|---|---|---|---|
| 4,581,714 A | * | 4/1986 | Reid | 702/86 |
| 4,873,655 A | * | 10/1989 | Kondraske | 702/86 |
| 5,604,685 A | * | 2/1997 | Seesink et al. | 702/86 |
| 5,948,368 A | * | 9/1999 | Hirai et al. | 422/119 |
| 6,035,721 A | * | 3/2000 | Krisch | 73/708 |

(Continued)

OTHER PUBLICATIONS

L. Landsberger, O. Grudin, et al., "Single-Chip CMOS Analog Sensor Conditioning IC's With Integrated Electrically-Adjustable Passive Resistors," Microbridge Technologies, Inc., ISSCC, San Francisco, Feb. 3-7, 2008.*

(Continued)

*Primary Examiner* — John Breene
*Assistant Examiner* — Jeffrey Aiello
(74) *Attorney, Agent, or Firm* — Norton Rose Fulbright Canada LLP

(57) ABSTRACT

A method for determining an unknown input measurand $P_{unk}$ of a sensor having a linear response at small input measurand levels and a non-linear response at large input measurand levels.

24 Claims, 11 Drawing Sheets

(56) References Cited

U.S. PATENT DOCUMENTS

| | | | |
|---|---|---|---|
| 6,163,031 A * | 12/2000 | Abdel-Rahman | 250/374 |
| 7,043,374 B2 | 5/2006 | Wang et al. | |
| 7,285,963 B2 * | 10/2007 | Talanov et al. | 324/635 |
| 7,668,693 B2 * | 2/2010 | Yoshihiro et al. | 702/179 |
| 2005/0256660 A1 * | 11/2005 | Laraia et al. | 702/107 |
| 2006/0265167 A1 * | 11/2006 | Laraia et al. | 702/99 |
| 2008/0125982 A1 * | 5/2008 | Yoshihiro et al. | 702/53 |
| 2008/0173065 A1 * | 7/2008 | Woodford et al. | 73/1.06 |
| 2008/0221822 A1 * | 9/2008 | Laverdiere et al. | 702/100 |
| 2009/0049887 A1 * | 2/2009 | Wade | 73/1.88 |
| 2010/0268485 A1 * | 10/2010 | Bey et al. | 702/45 |
| 2012/0166124 A1 * | 6/2012 | Grudin | 702/98 |

OTHER PUBLICATIONS

"Nano-Air-Flow Based Differential Pressure Sensor for Medical Respiration Measurement Applications," Microbridge Technologies, Inc., Apr. 2009.*

Landsberger et al., Single-Chip CMOS Analog Sensor Conditioning IC's with Integrated Electrically-Adjustable Passive Resistors, Solid-State Circuits Conference, 2008, ISSCC 2008. Digest of Technical Papers. IEEE International Feb. 2008.

* cited by examiner

SENSOR RESPONSE CALIBRATION FOR LINEARIZATION

CROSS-REFERENCE TO RELATED APPLICATIONS

The present application claims priority under 35 USC 119 (e) of U.S. Provisional Patent Application bearing Ser. No. 61/240,380 and filed Sep. 8, 2009, the contents of which are hereby incorporated by reference.

TECHNICAL FIELD

The present invention relates to techniques for sensor-response calibration, for linearization, and for temperature compensation, and devices to implement these techniques. More specifically, the present invention relates to, and is applicable to, linearization and temperature compensation of thermal micro-flow sensors used to measure low differential pressure, and gas or liquid flows.

BACKGROUND OF THE ART

Sensors used in various measurement systems convert measurands (physical parameters) into electrical signals. Signal processing circuits typically provide further amplification of such raw signals coming from the sensor, as well as linearization and temperature compensation. In this context, linearization is the ability of the device to closely approximate a linear relationship between the actual physical parameter being sensed (the measurand) and the device's output representing that physical parameter. Temperature compensation is the ability of the device to produce output signals which are relatively immune to variations of ambient temperature.

The accuracy and efficiency of linearization approximation algorithms depend on the type and extent of sensor non-linearity. In some cases linearization of an essentially non-linear sensor requires high order polynomial approximations, or approximations by other functions, using a large number of approximation coefficients. For accurate temperature-compensated measurements, these coefficients determined with high precision must also be temperature-dependent in order to correct temperature related aberrations of the sensor's non-linear response. As a result, the requirements for precision and computational resources used in post-calibration signal processing may become a burden.

Therefore, there is a need to develop new techniques to linearize and perform temperature compensation of various types of sensors.

SUMMARY

In accordance with a first broad aspect, there is provided a method for determining an unknown input measurand $P_{unk}$ of a sensor having a linear response at small input measurand levels and a non-linear response at large input measurand levels, the method comprising: (a) identifying a reference calibration function $P_{ref}(U)$ for sensors of a given type, where argument U is a sensor output signal and $P_{ref}$ is a measurand value; (b) calibrating the sensor with respect to the reference calibration function $P_{ref}(U)$ by: (i) determining a first coefficient G to adjust sensor sensitivity to fit the function $P_{ref}(U)$ at low measurand levels; (ii) determining a second coefficient K, which, when it multiplies both a sensor output and a measurand value, stretches a response curve of the sensor to fit the function $P_{ref}(U)$ at high measurand levels; (c) determining the unknown input measurand $P_{unk}$ by calculating the input measurand from $P_{unk}=P_{ref}(K \cdot G \cdot U_m)/K$, where $U_m$ corresponds to an output of the sensor that results from applying the unknown input measurand $P_{unk}$.

It should be understood that the step of identifying the reference calibration function can be as involved as determining what the function should be, or as uninvolved as being given a reference calibration function $P_{ref}(U)$ and recognizing that this is the function to be used for the calibration of the sensor.

In accordance with another broad aspect, there is provided a system for determining an unknown input measurand $P_{unk}$ of a sensor having a linear response at small input measurand levels and a non-linear response at large input measurand levels, the system comprising: (a) a calibration module for calibrating the sensor with respect to a reference calibration function $P_{ref}(U)$, where argument U is a sensor output signal and $P_{ref}$ is a measurand value, by: (i) determining a first coefficient G to adjust sensor sensitivity to fit the function $P_{ref}(U)$ at low measurand levels; (ii) determining a second coefficient K, which, when it multiplies both a sensor output and a measurand value, stretches a response curve of the sensor to fit the function $P_{ref}(U)$ at high measurand levels; (b) a processing module for determining the unknown input measurand $P_{unk}$ by calculating the input measurand from $P_{unk}=P_{ref}(K \cdot G \cdot U_m)/K$, where $U_m$ corresponds to output of the sensor that results from applying an unknown input measurand $P_{unk}$.

In accordance with a third broad aspect, there is provided a method for calibrating a response of a sensor having a linear response at small input measurand levels and a non-linear response at large input measurand levels, the method comprising: (i) determining a first coefficient G to adjust sensor sensitivity to fit a reference calibration curve at low measurand levels; (ii) determining a second coefficient K, which, when it multiplies both a sensor output and a measurand value, stretches a response curve of the sensor to fit the reference calibration curve at high measurand levels.

A sensor response curve should be understood as a function relating the measurand value and the sensor output. Sensitivity is a property of a sensor response curve. For parts of the response curve which are linear, the sensitivity is the slope or proportionality constant relating output and measurand in that linear portion.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
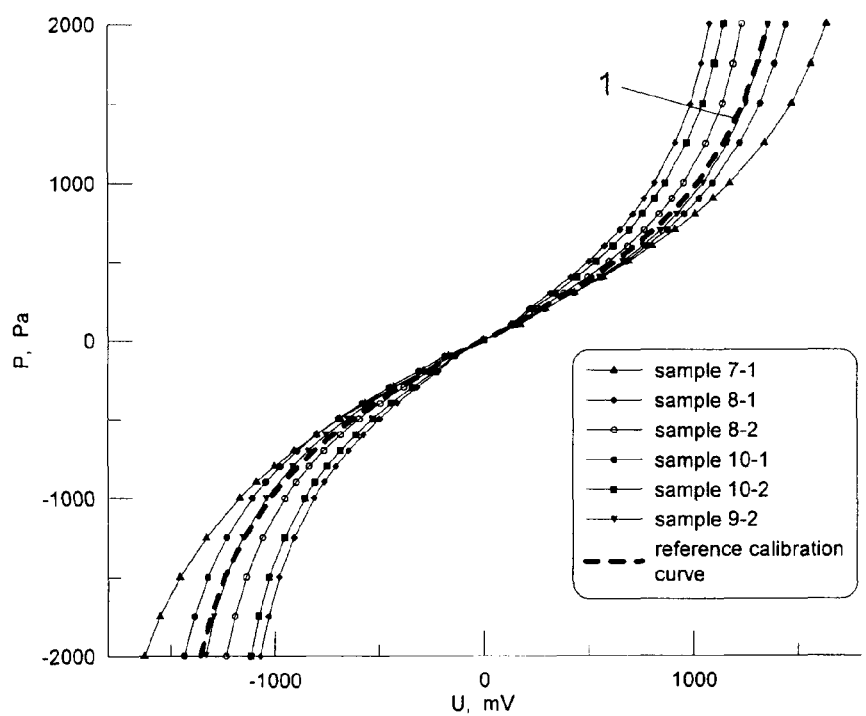
FIG. 1 shows some experimentally measured differential-pressure responses of six micro-flow based differential pressure sensors.

One type of sensor which often requires linearization and temperature compensation is a thermal micro-flow sensor. This sensor uses a thermal measurement principle based on unequal cooling/heating of two temperature-sensitive elements positioned in a flow channel symmetrically on opposite sides of a central heater. Fluid (gas or liquid) flow passing through the channel (and causing a temperature imbalance of the two sensing elements) is proportional to the differential pressure applied to the pressure/flow ports of the sensor. Micro-flow based sensors are used in the measurement of very low differential pressures or gas/liquid flows.

Some features of typical micro-flow based sensors make their linearization and temperature compensation non-trivial. First, the sensors demonstrate an essentially linear response at low levels of input measurand (differential pressure). In some cases of such sensors having low noise, the pressure response remains linear in a wide dynamic range of about 1000 (for example, differential pressure ranging from fractions of Pa to several hundred Pa with non-linearity of less than 0.2%). However, at higher pressures (for example, up to several kPa), the pressure response is significantly non-linear (and still monotonic). Therefore, the entire dynamic range (including the linear sub-range) within which the sensor response should be linearized may exceed 10000×. In addition, the sensitivity of the micro-flow sensor to gas flows depends on the gas density, which in turn depends on the ambient temperature. As a result, the sensitivity of the sensor has a strongly negative temperature coefficient, around −1%/° C., with substantial distortions of the non-linear response curve at different temperatures.

Accordingly, there is proposed herein a method for providing a linear and temperature compensated output from a sensor having a non-linear response, comprising the following steps. In the first step, a reference calibration function $P_{ref}(U)$, is determined, where the argument U is the sensor's output signal, (for example an analog electrical signal, which may or may not be amplified), and input measurand $P_{ref}$ is a reference calibration function. The reference calibration function, $P_{ref}(U)$, (which can be presented, for example as a set of N points $(U_j, P_{ref\_j})$, where $1 \le j \le N$), is a best representative approximation for a group of sensors of the same type having substantially linear dependence at small input measurands and non-linear dependence at large input measurands. The number of points (sensor output and certain input measurand), N, is a reasonable number which gives good enough accuracy for interpolation between points. The reference calibration function, or set of measurand levels, $P_{ref}(U)$, is stored for later use.

The second step of the method is calibration of a sensor and comprises obtaining non-linear raw output signals $U_{m\_i}$ from the sensor as a result of applying a set of M known input measurands $P_i$ where $1 \le i \le M$. This is followed by multiplying (or amplifying by a multiplicative factor) the raw signals by a first coefficient G to obtain a set of M amplified signals $G \cdot U_{m\_i}$. A first coefficient G is determined so as to provide best fitting between a set of points $(G \cdot U_{m\_i}, P_i)$ and the reference calibration function $P_{ref}(U)$ at small input measurands $P_i$. A second coefficient K is determined so as to provide a best fitting between the set of points $(K \cdot G \cdot U_{m\_i}, K \cdot P_i)$ and the reference calibration function $P_{ref}(U)$ at large input measurands $P_i$. Coefficients G and K may then be stored.

Fitting of the sensor response curve to the reference calibration curve $P_{ref}(U)$ with first coefficient G is equivalent to performing adjustment of the sensor sensitivity. Such an adjustment applied to multiple sensors provides the same sensitivity for all the sensors at low measurand levels. A second adjustment with the second coefficient K, is equivalent to stretching the sensor response curve. Such a transformation does not change the slope of the sensor response in its linear zone, at low measurand levels. At high measurand levels, the stretching transformation allows convergence of the sensor response curve and reference calibration curve $P_{ref}(U)$.

The third step of the method is post-calibration correction of the sensor response to unknown input measurand $P_{unk}$. This comprises applying an unknown input measurand to the sensor; obtaining a non-linear raw signal $U_m$ from the sensor; multiplying (or amplifying by a multiplicative factor) the raw signal by first coefficient G to generate an amplified signal $U_{amp} = G \cdot U_m$; multiplying the amplified signal $U_{amp}$ by coefficient K; determining an intermediate value $P_{int}$ from the reference calibration function as $P_{int} = P_{ref}(K \cdot U_{amp})$; and calculating the input measurand as $P_{unk} = P_{int}/K$.

To illustrate the details of the linearization and temperature compensation methods, six experimental samples of thermal micro-flow based differential pressure sensors were used. In this embodiment, each sensor contains a gas flow sensing element, analog amplification circuitry having a positive temperature coefficient of gain, and an offset adjustment module, all integrated on the same silicon chip (called the "device-chip"). The device-chip also has, affixed to its surface, a "cap-chip", which is another silicon chip which has a pre-etched groove in its surface which is mated with the device-chip. A micro-flow channel is formed by attaching this cap-chip to the top of the device-chip such that the groove is precisely aligned with respect to the flow sensing element and serves as a gas flow passage. Offset and temperature drift of offset are adjusted using a technique such as is described in [L. Landsberger, O. Grudin, S. Salman, T. Tsang, G. Frolov, Z. Huang, B. Zhang, M. Renaud, "Single-Chip CMOS Analog Sensor Conditioning IC's with Integrated Electrically-Adjustable Passive Resistors", Solid-State Circuits Conference, 2008. ISSCC 2008. Digest of Technical Papers. IEEE International, February 2008].

In one embodiment, linearization of the set of sensor outputs includes three general phases. In the first phase, a reference calibration curve is determined. The calibration curve is a best representative curve for a family of the sensors and serves as target for calibration of each individual sensor. This calibration curve is relatively similar to the curve of real sensor outputs, in order to serve as a calibration standard from which variations of the real sensors are minor. Calibration of each individual sensor is the second stage, which includes applying a set of known input measurands (e.g. differential pressures), and measuring the corresponding output signals of the sensor. Then, individual calibration coefficients are determined to provide conversion of each individual sensor's response curve into the targeted reference calibration curve, as a result of certain mathematical procedures. The reference calibration curve (one curve for all sensors of one type), and the individual calibration coefficients, are stored for later utilization. This calibration phase (second phase) obtains the needed unit-by-unit specific calibration information. In the third phase, (comprising the actual measurements and their interpretation/readout), an unknown input measurand is applied to the sensor and the output sensor signal is measured. A special signal processing algorithm is then used to calculate the input measurand, using the previously-stored reference calibration curve and calibration coefficients outlined above in the first and second phases.

Consider the three linearization phases in more detail. With respect to phase 1, FIG. 1 shows the differential pressure response of the sensors after offset adjustment, where P is the applied differential pressure measurand, measured in Pa, and U is the output signal of the sensor amplified by the on-chip analog amplifier, measured in mV. The dashed reference calibration curve labeled "1" in FIG. 1, which represents the relationship between an output electrical signal U and an input measurand P, is determined as an averaged sensor differential-pressure response with arbitrarily chosen sensitivity of 0.77 Pa/mV at small input signals (chosen arbitrarily, but necessarily relatively close to the actual sensitivity of the set of real sensors). The analytical function shown in Eq. 1 was used as an approximation of this reference response.

$$P_{ref}(U) = \frac{S_{ref} \cdot U}{1 - \left(\frac{|U|}{U_0}\right)^N} \cdot \frac{1}{1 - \left(\frac{|U|}{U_1}\right)^{N_1}} \quad (1)$$

Figure 2:
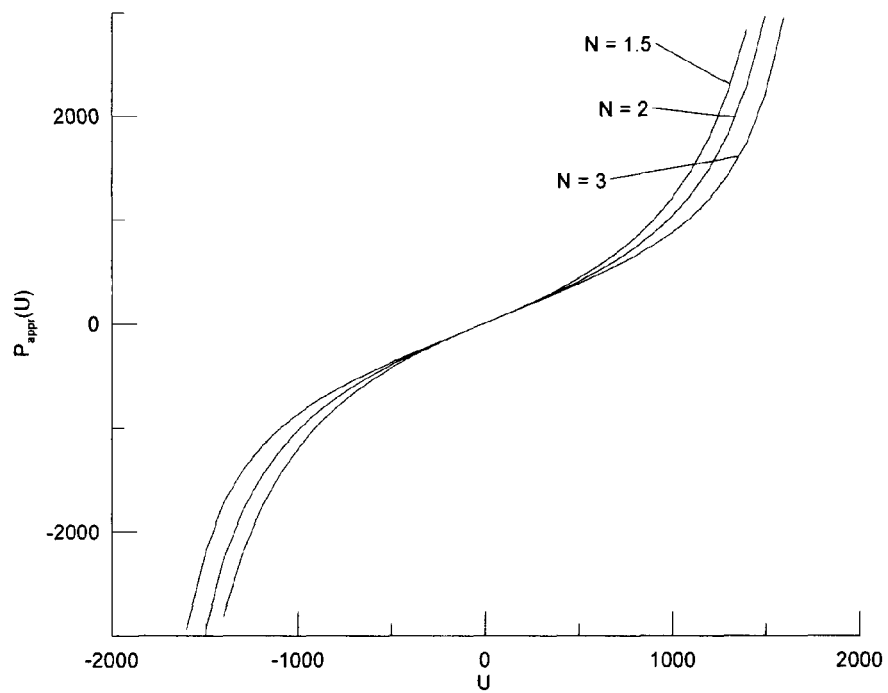
FIG. 2 presents examples of analytically determined calibration curves.

In this example, the sensitivity $S_{ref}$=0.77 Pa/mV; and $U_0$, $U_1$, N and $N_1$ are fitting coefficients. The coefficient $S_{ref}$ determines the slope of the reference curve at small input measurands. The coefficient $U_0$ can be interpreted as the highest output voltage that would be generated by the sensor at large input measurands which would occur when the output saturated (reached a plateau). The exponent N and coefficient $U_0$ together define the curvature of the reference calibration function at medium and large levels of measurands. It is also possible to fit the reference calibration function quite well with simpler analytical functions, obtained from Eq. 1 by setting $U_1$=∞. FIG. 2 shows several examples of the simplified analytical function $$P_{appr}(U) = \frac{S_{ref} \cdot U}{1 - \left(\frac{|U|}{U_0}\right)^N}$$

with $S_{ref}$=0.77 Pa/mV, $U_0$=1900 [mV] and N=1.5, 2, 3.

If needed, the multiplier $$\frac{1}{1 - \left(\frac{|U|}{U_1}\right)^{N_1}}$$

may be used to correct slightly the curvature of the reference curve at high signals, transforming $P_{appr}$(U) into Eq. 1.

Figure 3:
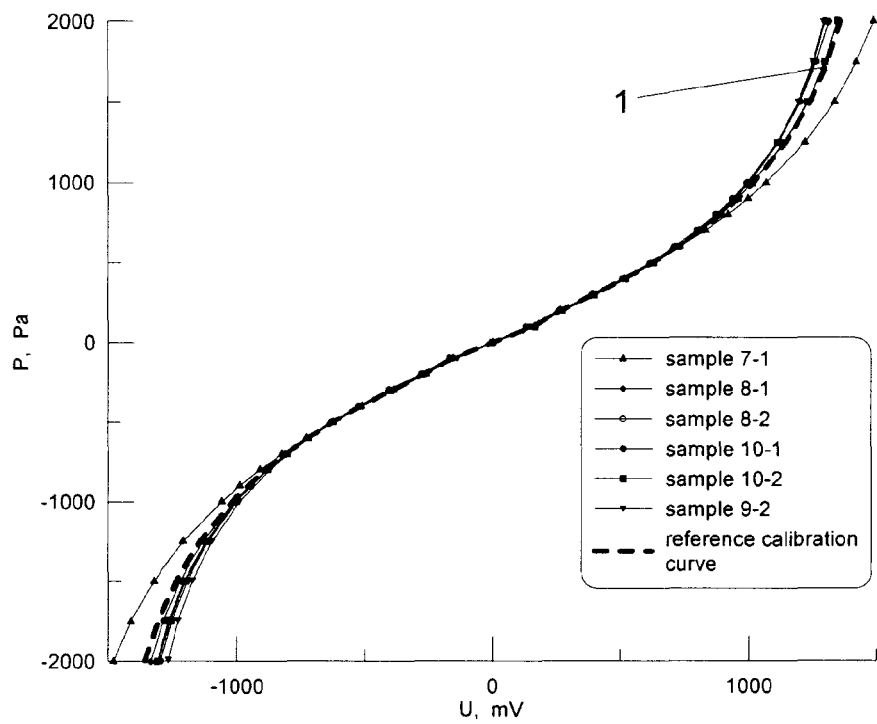
FIG. 3 shows some experimentally measured differential-pressure response of six micro-flow based differential pressure sensors after gain adjustment (amplification using six different coefficients G)
Figure 5:
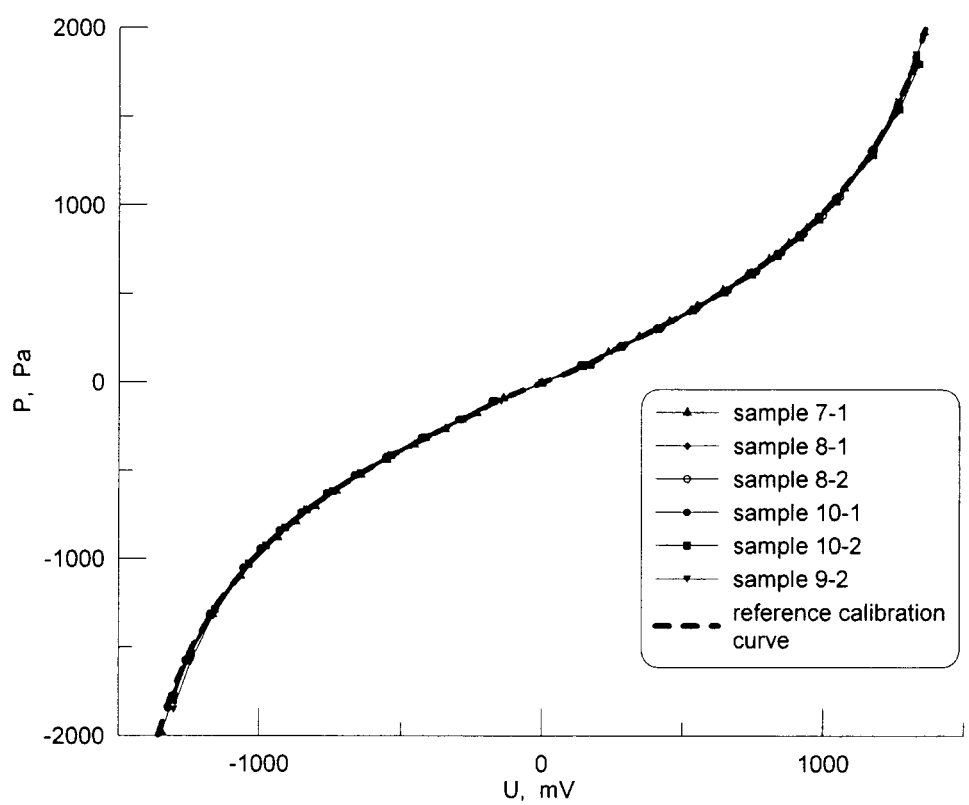
FIG. 5 shows some differential-pressure responses of six micro-flow sensors after correction of non-linearity using six different coefficients K.

The fitting coefficients used in the curve labeled "1", for $P_{ref}$(U), shown in FIGS. 1, 3, 5 are: $S_{ref}$=0.77 Pa/mV; $U_0$=1850 [mV]; $U_1$=1570 [mV]; N=2.4; $N_1$=24.

The reference calibration curve can be stored for further signal processing in the form of a look-up table or as a set of fitting coefficients used for calculation of the values of measurand P at measured sensor output signal U. Either form of stored calibration curve may be effective.

It should be understood that for sensors of another type, with a non-linear response different from what is described above and in the figures, a different set of approximation coefficients $S_{ref}$/$U_0$, $U_1$, N and $N_1$ and/or a different analytical function $P_{ref}$(U) can be used to reach an appropriate approximation. Note that a polynomial fit to this type of sensor response may require a larger number of polynomial fitting coefficients.

Figure 16:
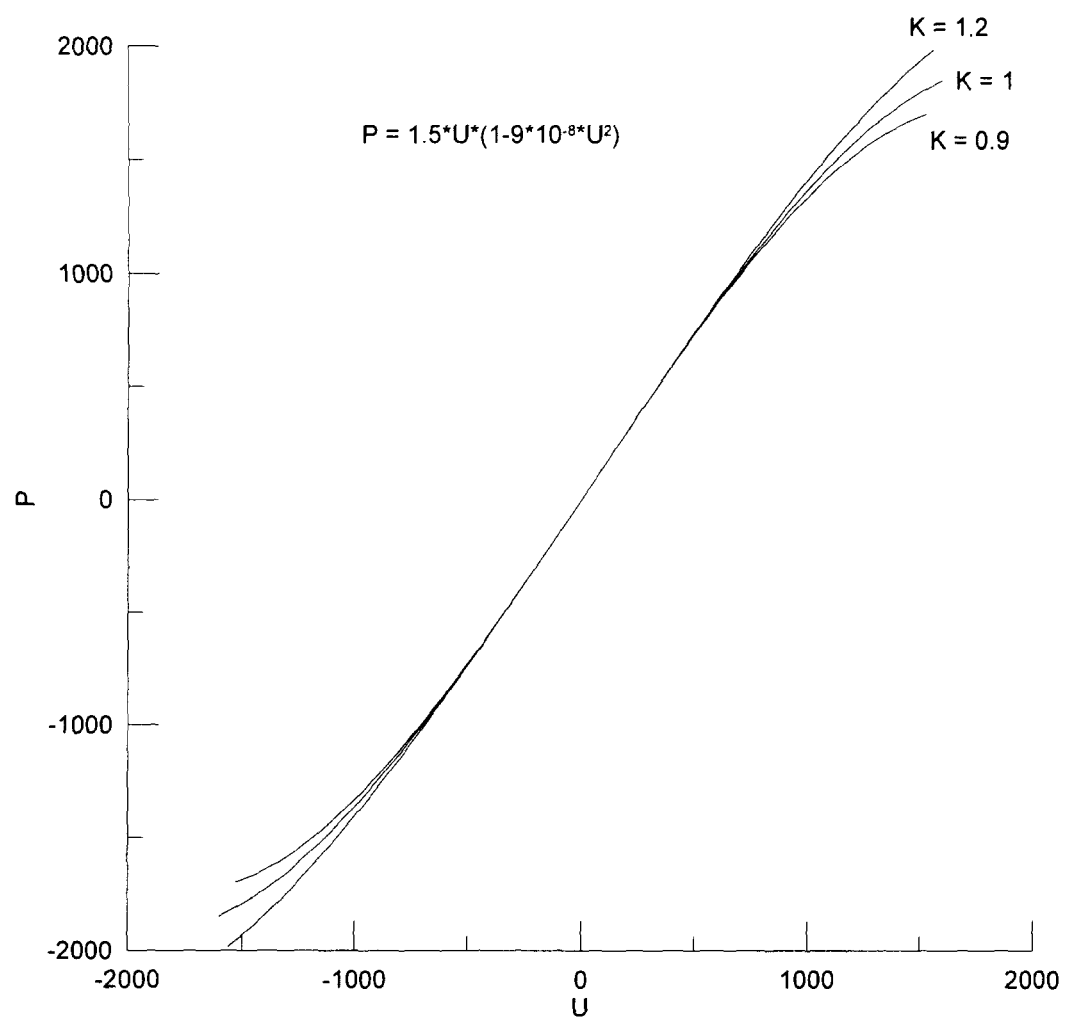
FIG. 16 shows an alternate example of curvature adjustment of a simulated arbitrary non-linear function.

In general, as long as the sensor's response is essentially linear at small input measurands, and non-linear at large input measurands, the present method of adjustment of the curvature of the sensor's response can be applied. The reference calibration curve can be an analytical function or a set of points (U, $P_{ref}$), as long as the behavior of the reference calibration curve is essentially linear at small input measurands and non-linear at large input measurands. FIG. 16 shows another example of a different hypothetical analytical function, P=1.5U(1−9·10$^{-8}$U$^2$), to which the present methods can be applied. Note that this alternative function, in addition to being a different analytical form, also has curvature in the opposite direction from the function in Eq. 1.

In one embodiment of phase 2, the calibration procedure starts with the adjustment of the gain of the amplifier (which is intentionally relatively linear) integrated with the micro-flow sensor, so as to reach the target sensitivity at small input measurands. Consider the uncompensated small measurand sensitivity $S_{ind}$ of an individual sensor. This $S_{ind}$ is, in general, a constant which is different from the reference sensitivity $S_{ref}$. The gain $G_{ind}$ of the individual amplifier integrated with the micro-flow sensor is adjusted to compensate this individual variability of sensor sensitivity $S_{ind}$, and reach the target sensitivity at small input signals ($S_{ref}$=0.77 Pa/mV in this example). Gain $G_{ind}$ can be defined as $G_{ind}$=$S_{ref}$/$S_{ind}$. FIG. 3 shows the experimentally measured differential-pressure response of the six sensors, after the gain adjustment. Note that the portions of the curves corresponding to small input measurands all coincide quite well, while the large-input portions don't yet correspond.

Figure 4:
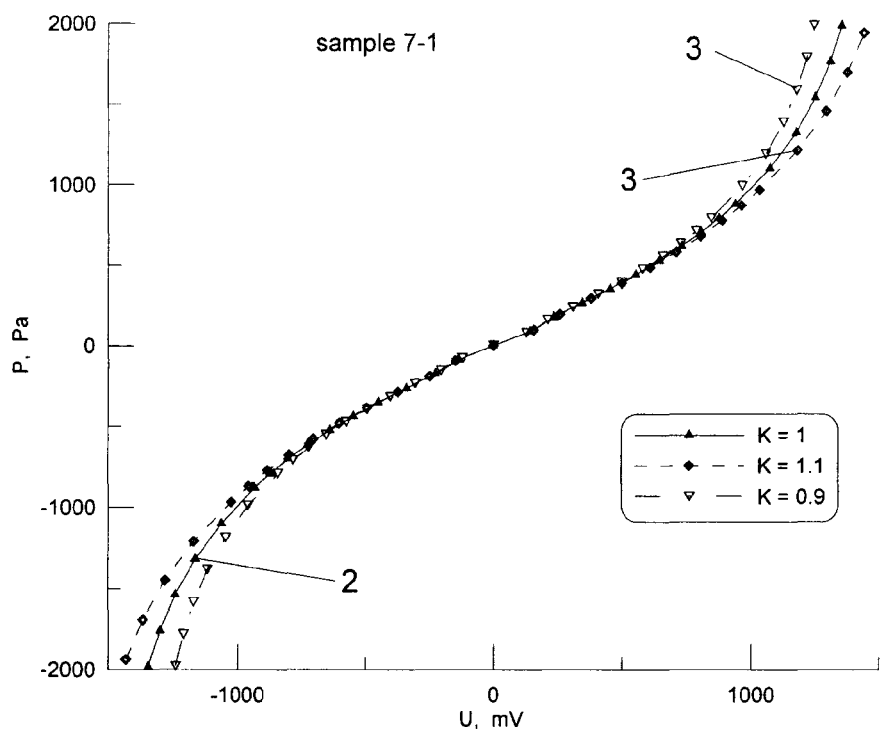
FIG. 4 shows some effects of a mathematical transformation of differential-pressure response of one of the sensors using the coefficient K.

The next step of calibration is correction of the sensor response at medium and large levels of measurand. Consider, for example, the differential-pressure response of one of the sensors, say sensor #7-1. The differential-pressure response of the sensor contains a set of M experimental points ($U_i$, $P_i$), where 1≤i≤M. A new set of points (K·$U_i$, K·$P_i$) represents a "stretched" response curve, where K is a simple multiplicative constant. FIG. 4 shows the original response 2 of the sensor after gain adjustment (where "original response" means K=1) and two simulated curves 3 built with K=0.9 and K=1.1. A feature of this simple mathematical transformation, which allows "stretching" of a non-linear curve, is that all three curves have the same linear slope at small measurands where the sensor has linear response. At the same time, the curvatures of curves 2 and 3 are significantly different at medium and large levels of measurand, depending on correction coefficient K. FIG. 5 shows the result of this type of transformation applied to all six sensors, with correction coefficients K shown in Table 1. These mathematically-determined correction coefficients K allow conversion of each individual response curve into one common reference calibration curve.

TABLE 1

| Sample # | 7-1 | 8-1 | 8-2 | 10-1 | 10-2 | 9-2 |
|---|---|---|---|---|---|---|
| K | 0.887 | 1.019 | 1.072 | 1.052 | 1.03 | 1.08 |

Therefore, in one embodiment, the described calibration procedure contains two adjustments—i) gain adjustment at small input measurands and ii) non-linearity correction at medium and large measurands. Only two individual calibration coefficients $G_{ind}$ and $K_{ind}$ must be adjusted to convert individual non-linear sensor response curves into one common reference calibration curve $P_{ref}(U)$, curve 1 in FIGS. 1 and 3.

In FIG. 16, the non-linear curvature of an alternative hypothetical function (at large input) is adjusted by multiplying both input P and output U by the same coefficient K, to accomplish "stretching" of the function. Again, the linear portion of the curve is unchanged by this "stretching", while the non-linear portion can be adjusted to match or approximate a given reference curvature.

In one embodiment described below, the first coefficient $G_{ind}$ is "stored" permanently in the analog amplification factor of an analog amplifier circuit, which directly amplifies the sensor's raw analog electrical output signal. The second calibration coefficient $K_{ind}$ is also stored to be used for later sensor signal processing. Note that the reference calibration curve $P_{ref}(U)$, for example curve 1 in FIGS. 1 and 3, representative of a specific type of sensors, is generated for a batch of sensors, before beginning the phase of individual calibration of each sensor of that type.

The third phase corresponds to the processing of actual signals coming from measurements made by the calibrated sensor, when an unknown input measurand $P_{unk}$ is applied to the sensor resulting in output signal $U_m$. The output signal (voltage) of the individual sensor is amplified by previously-calibrated gain $G_{ind}$, and the resulting corrected voltage $U_{cor} = U_m \cdot G_{ind}$ is fed to a digital processing module. Note that this amplification by $G_{ind}$ can be done before A-to-D conversion or can also be done digitally, after A-to-D conversion. After A-to-D conversion, the amplified signal is multiplied (e.g. in software) by the stored coefficient $K_{ind}$ for that individual sensor. Then an intermediate result $P_{int} = P_{ref}(K_{ind} \cdot U_{cor})$ is determined using the stored reference calibration curve $P_{ref}(U)$. This determination of an intermediate result $P_{int}$ can be implemented, for example, from a look-up table, if the reference calibration curve has been stored in this form, or implemented by calculation by a microprocessor using a predetermined formula (analogous to Eq. (1)), using the set of stored approximation coefficients. The input measurand is then calculated as:

$$P_{unk} = \frac{P_{int}}{K_{ind}} = \frac{1}{K_{ind}} P_{ref}(K_{ind} \cdot U) \quad (2)$$

Figure 6:
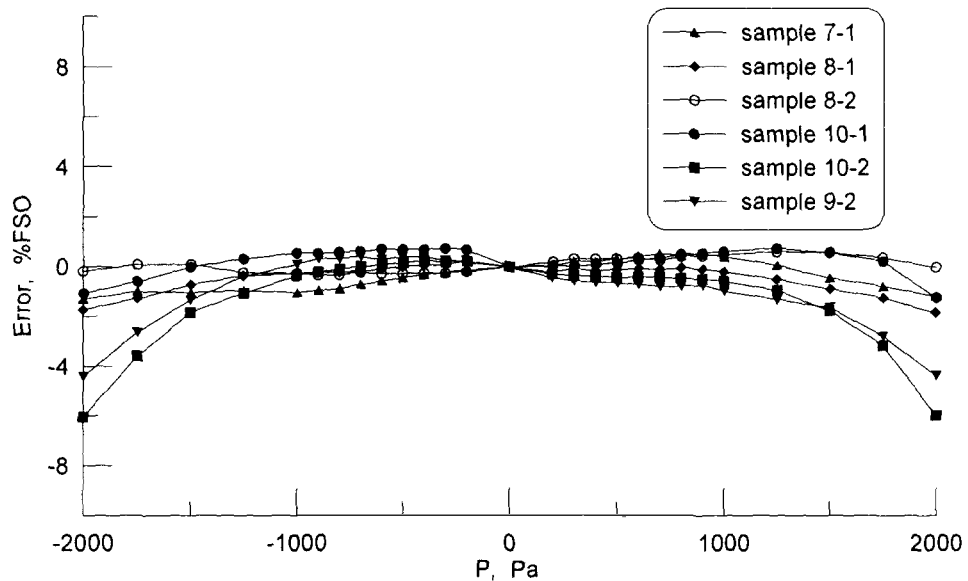
FIG. 6 presents some errors of six samples after application of the linearization procedure.

Error of the linearization procedure, an example of which is shown in FIG. 6, is the difference between the differential pressure $P_{unk}$, calculated from Eq. (2), and the actual differential pressure applied to the sensor. The larger error at large input measurands can be explained by non-symmetry of the sensors. This non-symmetry is higher for sensors #10-2 and 9-2.

Further correction of the observed error at large input measurands caused by non-symmetry of the sensors is possible by further adjusting the coefficient K as a linear function of output voltage U:

$$K(U) = K + \alpha \cdot U \quad (3)$$

Figure 7:
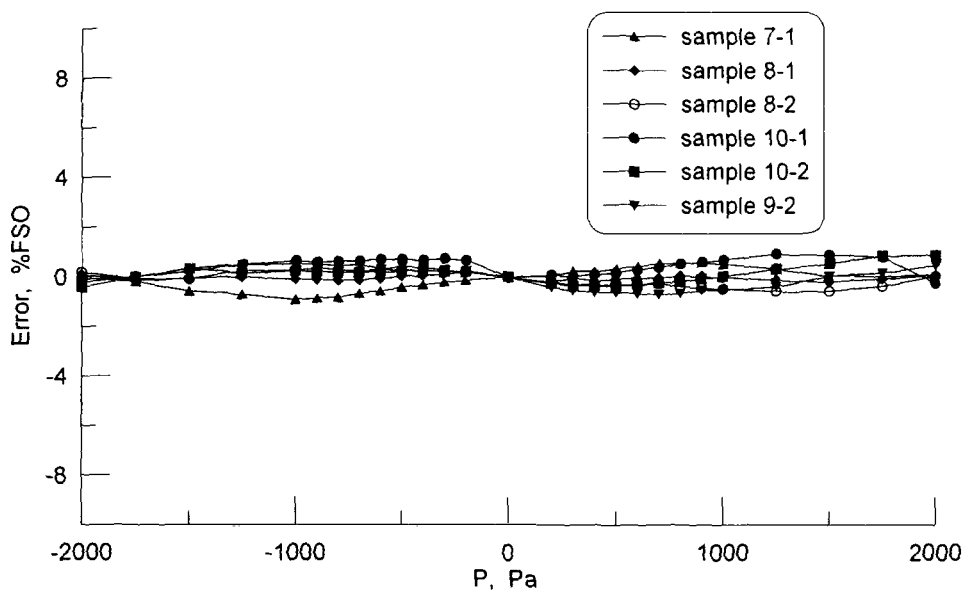
FIG. 7 presents some errors of six samples after application of the linearization procedure and after correction for the sensors' non-symmetry.

FIG. 7 shows error of the linearization procedure using voltage-dependent coefficients K(U) varying as described in Eq. (3). Coefficients a (in units of 1/V), and corresponding values of coefficients K(U) are shown in Tables 2 and 3.

TABLE 2

| Sample # | 7-1 | 8-1 | 8-2 | 10-1 | 10-2 | 9-2 |
|---|---|---|---|---|---|---|
| a, 1/V | −0.00337 | −0.00447 | 0 | −0.0023 | −0.015 | −0.0105 |

TABLE 3

| | K(U) for samples # | | | | | |
|---|---|---|---|---|---|---|
| U, V | 7-1 | 8-1 | 8-2 | 10-1 | 10-2 | 9-2 |
| −1.5 | 0.892 | 1.026 | 1.072 | 1.0554 | 1.0526 | 1.096 |
| −1 | 0.890 | 1.023 | 1.072 | 1.0543 | 1.045 | 1.091 |
| −0.5 | 0.889 | 1.021 | 1.072 | 1.0531 | 1.0375 | 1.0853 |
| 0 | 0.887 | 1.019 | 1.072 | 1.052 | 1.03 | 1.08 |
| 0.5 | 0.8853 | 1.017 | 1.072 | 1.051 | 1.022 | 1.0747 |
| 1 | 0.8836 | 1.0145 | 1.072 | 1.0497 | 1.015 | 1.069 |
| 1.5 | 0.882 | 1.012 | 1.072 | 1.049 | 1.007 | 1.064 |

In general, this is a procedure to calibrate the response of a sensor having a linear response at small input measurand levels and a non-linear response at large input measurand levels, to a pre-determined non-linear curve. Basically, each individual sensor is being "prepared" (calibrated) for lookup using a common non-linear curve/graph or lookup table.

A basic form of the method can be described as: a method of calibration of a device response whose response is linear at small input levels and non-linear at large input levels, the method comprising adjusting the linear slope at small input levels and then "stretching" the scales to compensate remaining non-linear variations at large input levels, in both cases calibrating with respect to a known standard reference curve.

With respect to temperature compensation of thermal micro-flow sensors, thermal micro-flow based sensors have rather large negative temperature coefficients of sensitivity. This negative temperature coefficient of sensitivity may be approximately −1%/° C., and is caused mainly by the temperature dependence of gas density. Temperature compensation of the sensor's sensitivity can be accomplished using a similar approach as described above, where only two calibration coefficients G and K are needed for both linearization and temperature compensation.

Figure 8:
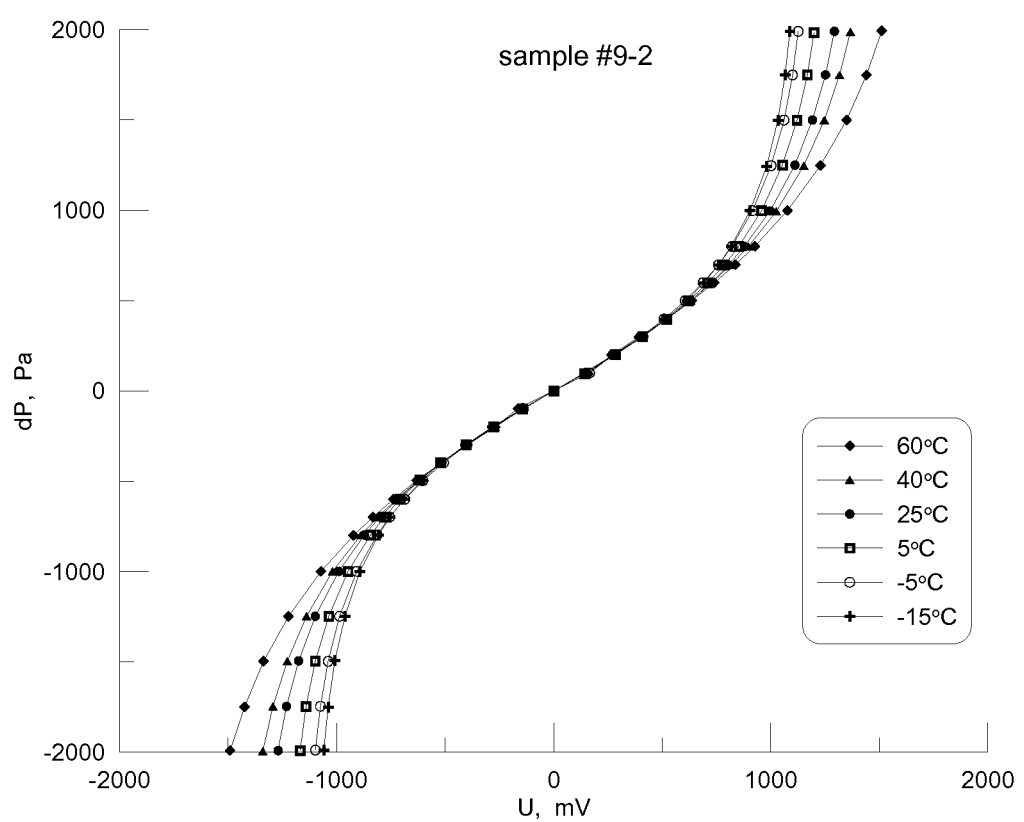
FIG. 8 shows some experimentally measured differential-pressure response of one micro-flow based differential pressure sensor at different temperatures.

The first step of this temperature compensation comprises making the gain G temperature-dependent with positive temperature coefficient TC-G which is opposite to the negative TC sensitivity of the sensor. FIG. 8 shows an experimentally measured differential-pressure response of the sensor #9-2 at different temperatures. The gain of the integrated amplifier is made to have temperature coefficient TC-G=−1%/° C., to counteract the negative temperature coefficient of sensitivity ~−1%/° C. This compensates the temperature drift of sensitivity in the linear sub-range at small and medium input measurands. However, substantial temperature-induced errors at large input measurands remain.

Figure 9:
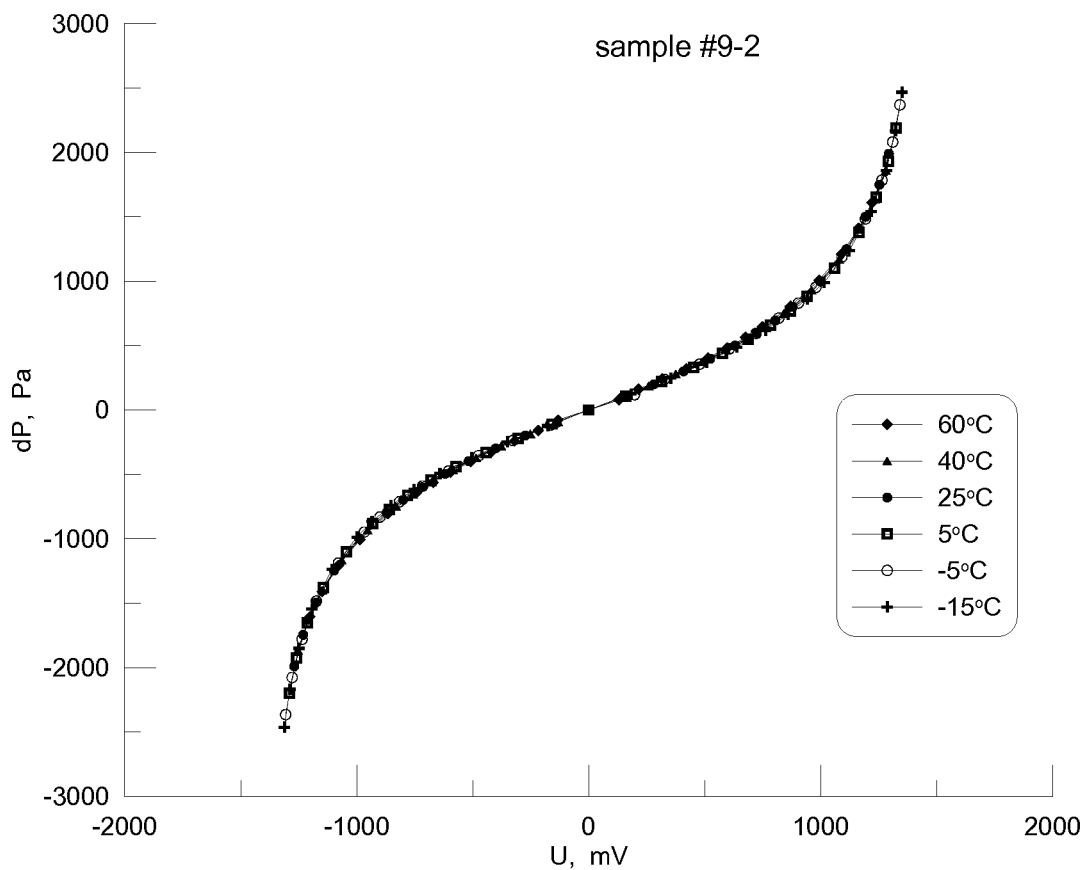
FIG. 9 shows an exemplary temperature-compensated differential-pressure response of one micro-flow sensor.
Figure 10:
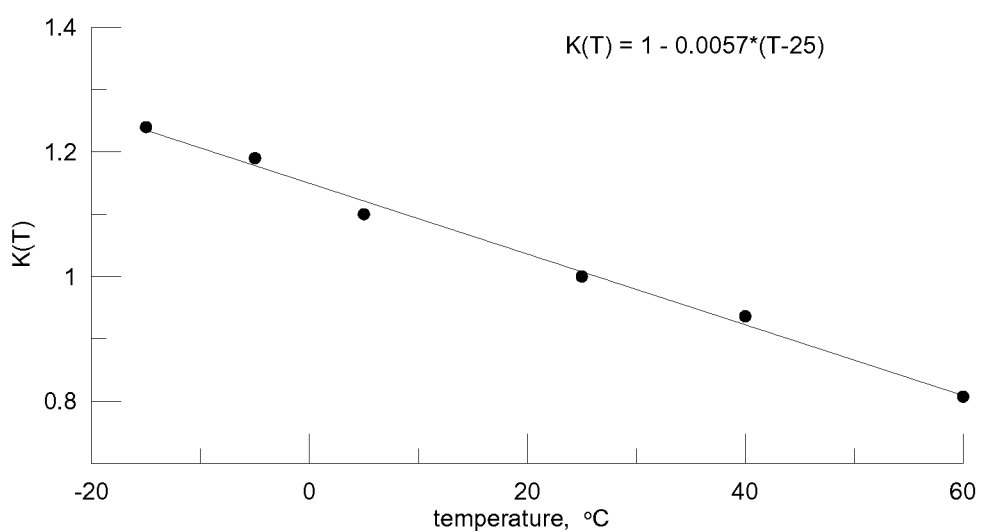
FIG. 10 is an example of the temperature dependence of a correction coefficient K.

As has been explained above (see FIG. 4), correction of differential-pressure non-linearity can be done by variation of the second coefficient K, resulting in "stretching" of the non-linear curve. The same approach allows conversion of all differential-pressure response curves of the sensor measured at different temperatures into one curve measured at, for example, 25° C. FIG. 9 shows the result of this conversion for the sensor #9-2. Correction coefficient K is plotted in FIG. 10 as a function of ambient temperature.

Accordingly, the correction coefficient K can be presented as $$K(U,T)=(K_0+a \cdot U) \cdot [1+b \cdot (T-25)] \quad (4)$$

where b=−0.0057 1/° C. is the temperature coefficient of the correction coefficient K.

Figure 11:
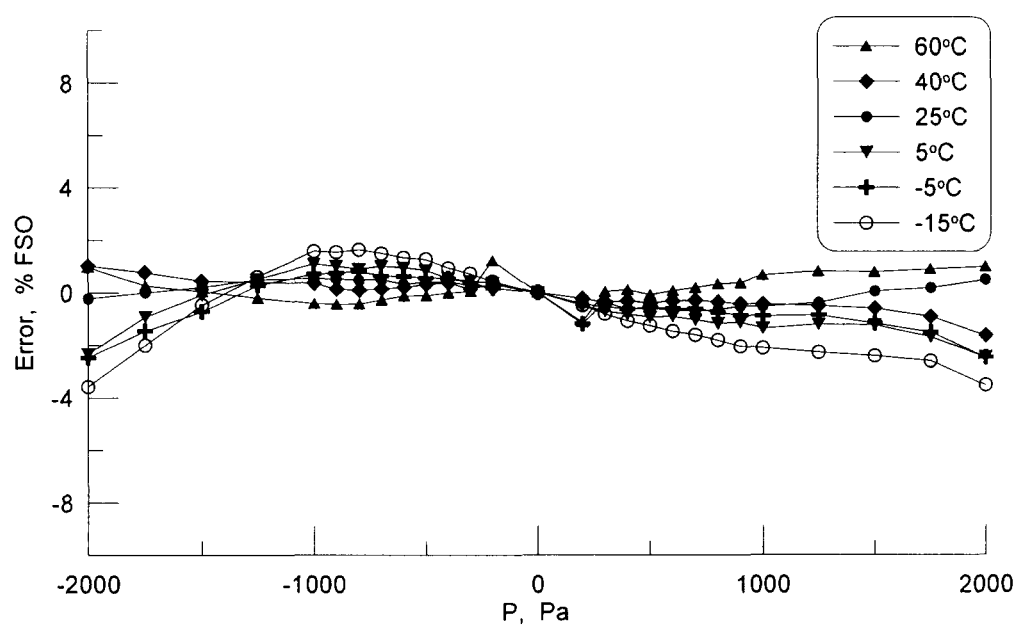
FIG. 11 presents total errors of linearization and temperature compensation procedure for one sensor (#9-2) at six different temperatures.

FIG. 11 shows the total error of linearization and temperature compensation for the sensor #9-2 in the temperature range from −15° C. to 60° C. Calculation of the input measurand was performed in accordance with equations (2) and (4), where $K_0$=1.08, a=−0.0105 [1/V], b=−0.0057 1/° C.

Note that in the given example, one part of the linearization and temperature compensation system is realized as analog circuitry, providing compensation of sensitivity and temperature drift of sensitivity at small input signals. Linearization and temperature compensation at large input signals are performed mathematically by signal processing which can be in turn implemented in any of a number of methods, including analog and/or digital techniques.

In general, the linearization and temperature compensation method can be realized on a system level using a combination of different approaches which provide optimal, economical and cost-effective solution for a particular application with specific technical requirements and having a specific type of non-linear sensor response. For example, adjustment of the two calibration coefficients G and K can be done digitally by storing these coefficients in memory together with the reference calibration curve. In this case, the analog part of the circuitry would be needed only for amplification of raw electrical signals obtained from the sensor to a level high enough for A/D conversion. All signal processing operations during calibration and actual measurements could be performed digitally.

Figure 12:
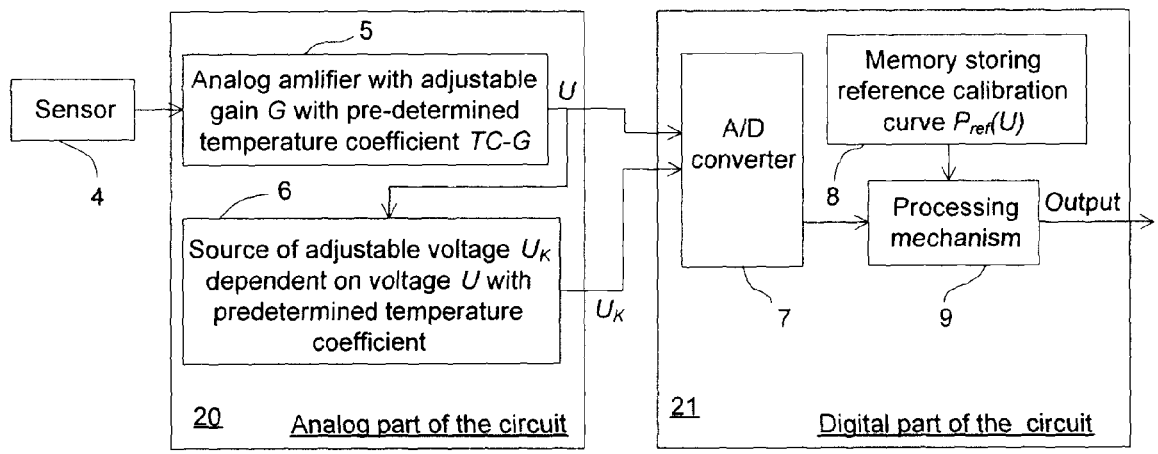
FIG. 12 is a schematic diagram of the system for linearization and temperature compensation of the sensor's non-linear response, in accordance with one embodiment.

In an alternative approach, shown schematically in FIG. 12, analog circuitry 20 can be used, (for example, to obtain more efficiency). For example, an amplifier 5 with adjustable gain G with predetermined temperature coefficient of gain TC-G, can provide calibration of the sensor 4 at low input signals. A second analog module 6 can be used to generate a voltage $U_K$ equivalent to the second correction coefficient K. A specific voltage $U_K$ (e.g. $U_K$=0.85V) may correspond to coefficient K (e.g. K=0.85). This second analog module 6, built using fixed and/or adjustable resistors with non-zero and standard amplifiers, can generate an output voltage as a linear function of temperature and of input voltage U in accordance with equation (4).

Figure 13:
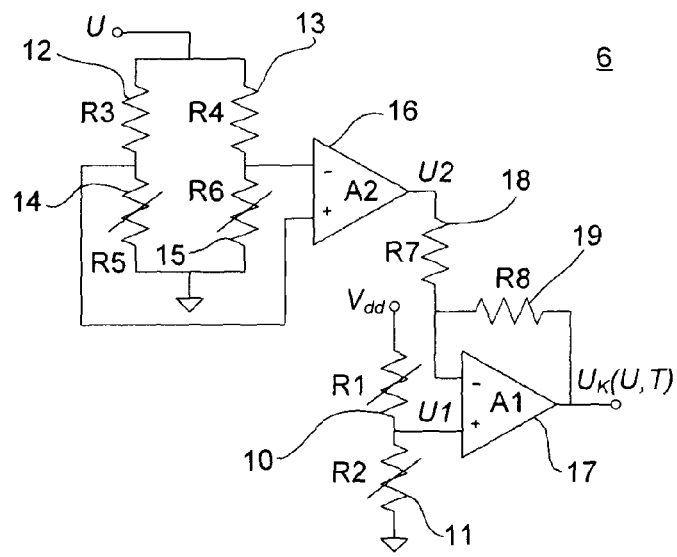
FIG. 13 shows an analog circuit for generation of correction voltage $U_K$, in accordance with one embodiment.

A schematic diagram of one possible realization of the second analog module 6 is shown in FIG. 13. Variable DC voltage $U_1$ is generated by using a divider consisting of two adjustable resistors $R_1$ 10 and $R_2$ 11. A bridge consisting of two fixed resistors $R_3$ 12 and $R_4$ 13 and two adjustable resistors $R_5$ 14 and $R_6$ 15 and amplifier $A_2$ 16 generate signal $U_2$ proportional to input voltage U. Subtraction of signals $U_1$ and $U_2$ and amplification of their difference is performed by amplifier $A_1$ 17. Gain of this amplifier $A_1$ 17 depends on the ratio of the two fixed resistors $R_7$ 18 and $R_8$ 19. Negative temperature coefficient of gain can be obtained by proper choice of TCR of the resistors $R_7$ 18 and $R_8$ 19.

Adjustment of the correction coefficient K described above and performed mathematically can be replaced by the equivalent procedure of the adjustment of output voltage $U_K$:

adjustment of resistors $R_1$ 10 and $R_2$ 11 is equivalent to the adjustment of coefficient $K_0$ in equation (4);
adjustment of the resistors $R_5$ 14 and $R_6$ 15 is equivalent to the adjustment of coefficient a in equation (4);
temperature coefficient of gain of amplifier $A_1$ 17 is equivalent to coefficient b in equation (4).

With this approach, two analog signals U and $U_K$ are fed to digital processing module 21. After A/D conversion performed by A/D converter 7, signal processing can be performed digitally in accordance with the present method by processing mechanism 9. First, signal U is multiplied by signal $U_K$. Then, intermediate value $P_{int}$ is determined from the reference calibration curve stored in a memory 8 as $P_{int}=P_{ref}(U \cdot U_K)$. Finally the input measurand P is calculated as P=$P_{int}/U_K$.

It should be understood that presenting the coefficient K as an electrical signal is not necessarily only as a DC voltage. Such an electrical signal can also be, for example, a frequency, a pulse width, a number of pulses, an AC voltage, or other types of signals which can represent the coefficient K. Depending on the particular choice of electrical signal to represent K, an appropriate read-out circuitry for this electrical signal, should be used prior to the processing mechanism.

This approach can be a cost-effective solution for applications where a digital processing module 21 is part of a larger measurement/control system and performs additional computational functions. Typically such modules may contain a multi-channel A/D converter, EEPROM memory, microcontroller, digital signal processor, etc. The proposed linearization and temperature compensation method, based on manipulations with two analog signals, requires minimal computational resources and can be realized in digital processing circuits.

Figure 14:
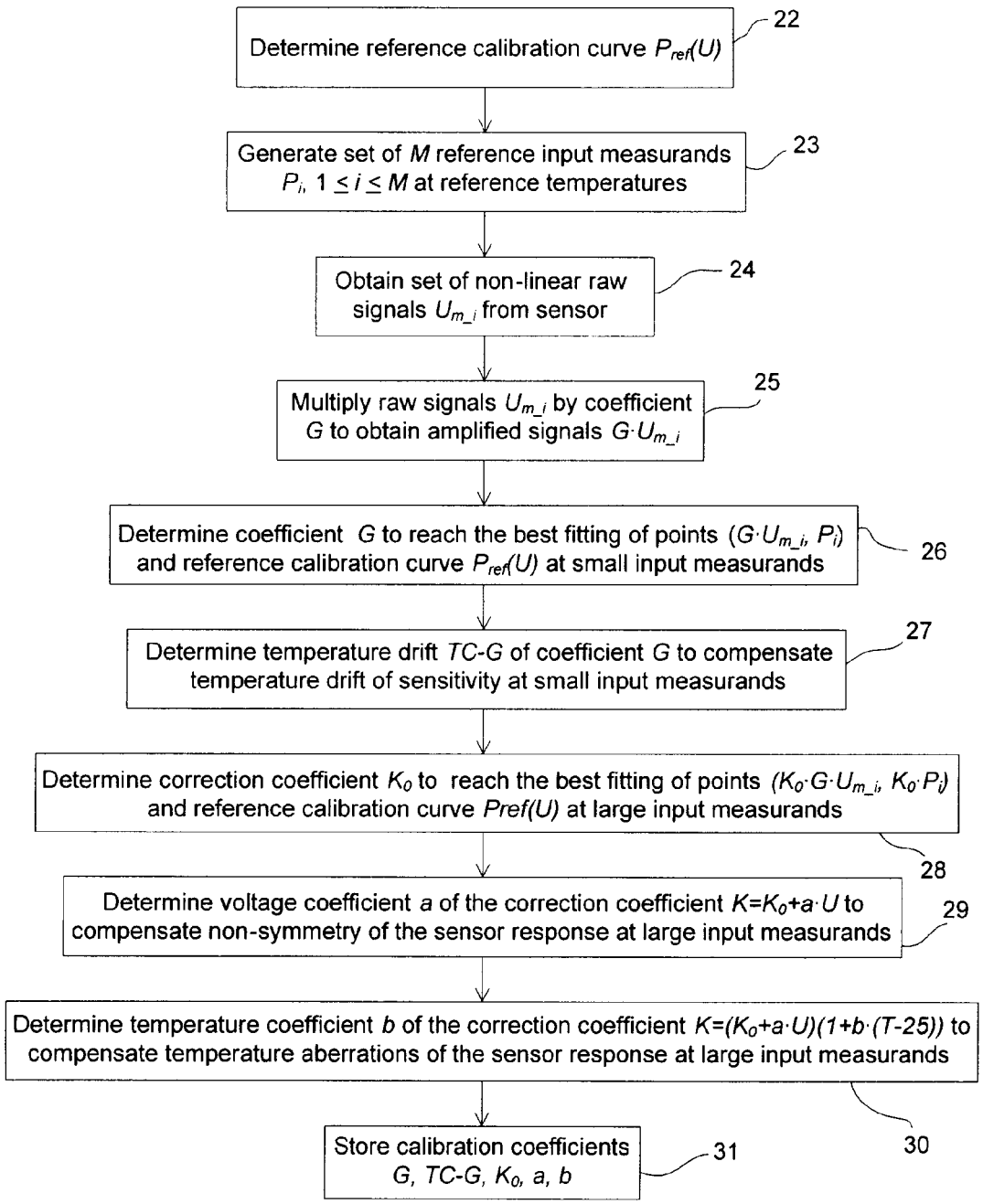
FIG. 14 presents Part I of a flow chart of operations in a method of linearization and temperature compensation, performed during calibration, in accordance with one embodiment.
Figure 15:
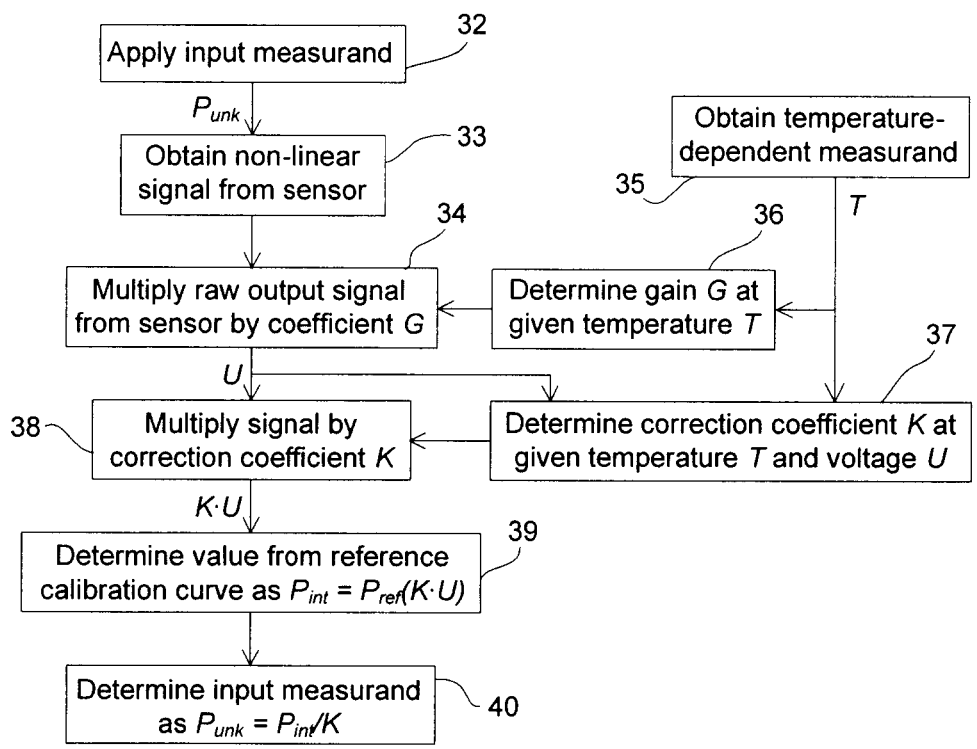
FIG. 15 presents Part II of a flow chart of operations in a method of linearization and temperature compensation, performed during measurements and sensor response correction, in accordance with one embodiment.

The main operations shown in the flow chart diagrams in FIGS. 14 and 15 are independent from which approach is used for implementation of the linearization and temperature compensation method. FIG. 14 illustrates the operations performed during the calibration procedure in accordance with one embodiment. The reference calibration curve which is the best representation of the relationship between an amplified output signal U and input measurand P may be determined for a certain group of sensors, as represented by block 22.

The calibration procedure is begun by applying a set of M reference input measurands to the sensor 23, and obtaining non-linear signals from the sensor 24. Step 25 represents amplification of a raw signal by gain G. Thereafter, as depicted at step 26, gain G is determined so as to provide a best fitting of experimentally measured points ($G \cdot U_{m\_i}$, $P_i$) to the reference calibration curve at small input measurands. The next operation described at step 27 is the determining of temperature drift TC-G of the coefficient G for compensation of temperature drift of sensitivity at small input measurands. Correction of non-linear sensor response by determining second coefficient $K_0$ and best fitting of points ($K_0 \cdot G \cdot U_{m\_i}$, $K_0 \cdot P_i$) and reference calibration curve at high input signals is depicted at step 28. Thereafter, step 29 indicates compensation of non-symmetry of the sensor response, and step 30 indicates correction of temperature dependent aberrations of the sensor response at large input measurands. Finally, determined coefficients G, TC-G, $K_0$, a, b are stored as depicted at step 31.

The flow chart diagram in FIG. 15 depicts operations performed during actual measurements of unknown input measurand $P_{unk}$. First, input measurand $P_{unk}$ is applied to the sensor as depicted at step 32 and converted into non-linear raw output signal as depicted at step 33. To provide temperature correction of coefficients G and K, a temperature-dependent input measurand is obtained as shown at step 35. Temperature corrected gain G depicted at step 36 is used to multiply a raw output signal as shown at step 34. Output signal U and temperature dependent input measurand are used to the correct second coefficient K as illustrated at step 37.

Thereafter, signal U is multiplied by voltage- and temperature-corrected coefficient K as illustrated at step 38. The next operation is determining intermediate value $P_{int}$ from the stored reference calibration function as depicted at step 39. Finally, signal $P_{unk}$ is determined as $P_{unk}=P_{int}/K$ as shown at step 40.

Consider several possibilities to simplify the proposed method of linearization and temperature compensation. Thermal micro-flow sensors with essentially non-linear differential-pressure response used as an example in some of the above embodiments have highly negative temperature drift of sensitivity at small input measurands and strong temperature-dependent aberrations of differential-pressure response at large input measurands. These specific features of the sensors, caused by physical principles of heat transfer in a gas flow, are common for thermo-anemometer-type sensors. In general, these temperature effects are reproducible for all sensors of the same type. Therefore, the temperature drift of coefficients G and K required for compensation of temperature related distortions of a differential-pressure response can be determined once for a large group of sensors, and need not be measured and adjusted for each sensor individually during its calibration. In this case, simplified calibration of the sensor can be performed at one temperature.

Errors of the presented method caused by non-symmetry of the sensor response, shown for example in FIG. 6, may be substantial at large input measurands. If a specific application requires a narrower measurement range, say +/−1000 Pa with acceptable error of +/−2%, then the existing non-symmetry of the sensors can potentially be neglected. In this case the determining of voltage coefficient a of the correction coefficient K would not be needed. The second analog module 20 could then be simplified by removing of the resistor bridge $R_3$ 12, $R_4$ 13, $R_5$ 14, $R_6$ 15 and amplifier $A_2$ 16. Note that a sensor with unidirectional output also does not need non-symmetry correction.

As a result, only two parameters G and $K_0$ may be adjusted in a calibration procedure to compensate individual variability of the sensor's differential-pressure response.

The differential-pressure response of thermo-anemometer-type gas micro-flow sensors depends also on gas composition. It should be understood that the proposed method of linearization and temperature compensation can be applied to sensors working with different gases. Correction coefficients G and K in this case should be dependent on the type of gas.

It should be noted that the present method can be applied for linearization and temperature compensation of sensors of other types from those already listed herein. It should be decided what level of integration is preferable for each particular application. For example, modules 5 and of analog part 20 of the linearization system can be integrated on one Silicon chip. It is also possible to integrate sensor 4 together on the same chip with these two analog modules.

The embodiments of the invention described above are intended to be exemplary only. The scope of the invention is therefore intended to be limited solely by the scope of the appended claims.

I claim:

1. A method for linearizing a sensor having a linear response at small input measurand levels and a non-linear response at large input measurand levels, the method comprising:
   (a) identifying a reference calibration function $P_{ref}(U)$ for sensors of a given type, where argument U is a sensor output signal and $P_{ref}$ is a measurand value;
   (b) calibrating the sensor with respect to the reference calibration function $P_{ref}(U)$ by:
      (i) determining a first coefficient G to adjust sensor sensitivity to fit the function $P_{ref}(U)$ at low measurand levels;
      (ii) determining a second coefficient K, which, when it multiplies both a sensor output and a measurand value, stretches a response curve of the sensor to fit the function $P_{ref}(U)$ at high measurand levels;
   (c) applying a post-calibration correction of the sensor output to an unknown input measurand $P_{unk}$ by:
      (iii) applying the unknown input measurand $P_{unk}$ to the sensor;
      (iv) obtaining an output $U_m$ from the sensor; and
      (iv) calculating the input measurand from $P_{unk}=P_{ref}(K \cdot G \cdot U_m)/K$.

2. The method of claim 1, wherein applying the post-calibration correction comprises:
   multiplying $U_m$ by the first coefficient G to generate a corrected signal $U_{cor}=G \cdot U_m$;
   multiplying the corrected signal $U_{cor}$ by the second coefficient K;
   determining an intermediate value $P_{int}$ from the reference calibration function as $P_{int}=P_{ref}(K \cdot U_{cor})$; and
   calculating the input measurand as $P_{unk}=P_{int}/K$.

3. The method of claim 1, wherein said coefficient G is a function of temperature.

4. The method of claim 1, wherein said coefficient G has a temperature coefficient of opposite sign and same absolute value as a temperature coefficient of sensor sensitivity at low input measurands.

5. The method of claim 1, wherein said coefficient K is function of temperature.

6. The method of claim 1, wherein said coefficient K is a linear function of temperature.

7. The method of claim 1, wherein said coefficient K is function of the sensor output signal.

8. The method of claim 7, wherein said coefficient K is a linear function of the sensor output signal.

9. The method of claim 1, wherein the reference calibration function is an analytical formula having the form:

$$P_{ref}(U) = \frac{S_{ref} \cdot U}{1 - \left(\frac{|U|}{U_0}\right)^N} \cdot \frac{1}{1 - \left(\frac{|U|}{U_1}\right)^{N_1}},$$

where U is the sensor output signal, $S_{ref}$ is a sensitivity of the sensor at low input measurands and $U_o$, $U_1$, N and $N_1$ are fitting coefficients.

10. The method of claim 1, wherein the reference calibration function is an analytical formula having the form:

$$P_{appr}(U) = \frac{S_{ref} \cdot U}{1 - \left(\frac{|U|}{U_0}\right)^N}.$$

where U is the sensor output signal, $S_{ref}$ is a sensitivity of the sensor at low input measurands and $U_o$ and N are fitting coefficients.

11. The method of claim 1, wherein steps (i) and (ii) comprise:
   (i) selecting and storing the first coefficient G to provide a best fitting between a set of points ($G \cdot U_{m\_i}$, $P_i$) and the reference calibration function $P_{ref}(U)$ at low measurand levels, where $U_{m\_i}$ corresponds to an output of the sensor that results from applying a known measurand $P_i$; and
   (ii) selecting and storing the second coefficient K to provide a best fitting between a set of points ($K \cdot G \cdot U_{m\_i}$, $K \cdot P_i$) and the reference calibration function $P_{ref}(U)$ at high measurand levels, the second coefficient K being a stretching coefficient.

12. A system for linearizing a sensor having a linear response at small input measurand levels and a non-linear response at large input measurand levels, the system comprising:
   (a) a calibration circuit for calibrating the sensor with respect to a reference calibration function $P_{ref}(U)$, where argument U is a sensor output signal and $P_{ref}$ is a measurand value, by:
      (i) determining a first coefficient G to adjust sensor sensitivity to fit the function $P_{ref}(U)$ at low measurand levels;
      (ii) determining a second coefficient K, which, when it multiplies both a sensor output and a measurand value, stretches a response curve of the sensor to fit the function $P_{ref}(U)$ at high measurand levels;
   (b) a processing for circuit for applying a post-calibration correction of the sensor output to an unknown input measurand $P_{unk}$ by:
      (iii) applying the unknown input measurand $P_{unk}$ to the sensor;
      (iv) obtaining an output $U_m$ from the sensor; and
      (iv) calculating the input measurand from $P_{unk} = P_{ref}(K \cdot G \cdot U_m)/K$.

13. The system of claim 12, further comprising:
   (c) a sensor having a linear response at small input measurand levels and a non-linear response at large input measurand levels; and
   (d) a memory for storing the reference calibration function, the first coefficient G, and the second coefficient K.

14. The system of claim 12, wherein said calibration circuit comprises an analog amplifier with adjustable gain, the amplifier providing amplification of raw signal from the sensor.

15. The system of claim 14, wherein the adjustable gain is a function of temperature.

16. The system of claim 12, wherein the adjustable gain has a temperature coefficient of opposite sign and same absolute value as a temperature coefficient of sensor sensitivity at low input measurands.

17. The system of claim 12, wherein the coefficient K is presented in a form of an electrical signal.

18. The system of claim 17, wherein the electrical signal is a function of temperature.

19. The system of claim 18, wherein the electrical signal is a linear function of temperature.

20. The system of claim 17, wherein said electrical signal is a function of the sensor output signal.

21. The system of claim 17, wherein the electrical signal is a linear function of the sensor output signal.

22. The system of claim 12, wherein the processing circuit comprises an analog-to-digital converter to digitize output signals from the calibration circuit.

23. The system of claim 12, wherein the processing module is adapted to:
   multiply $U_m$ by the first coefficient G to generate a linear-corrected signal $U_{cor} = G \cdot U_m$;
   multiply the linear-corrected signal $U_{cor}$ by the second coefficient K;
   determine an intermediate value $P_{int}$ from the reference calibration function as $P_{int} = P_{ref}(K \cdot U_{cor})$; and
   calculate the input measurand as $P_{unk} = P_{int}/K$.

24. The system of claim 12, wherein the calibration circuit is adapted to:
   (i) select and store the first coefficient G to provide a best fitting between a set of points ($G \cdot U_{m\_i}$, $P_i$) and the reference calibration function $P_{ref}(U)$ at low measurand levels, where $U_{m\_i}$ corresponds to an output of the sensor that results from applying a known measurand $P_i$; and
   (ii) select and store the second coefficient K to provide a best fitting between a set of points ($K \cdot G \cdot U_{m\_i}$, $K \cdot P_i$) and the reference calibration function $P_{ref}(U)$ at high measurand levels, the second coefficient K being a stretching coefficient.

* * * * *